Figure 1:
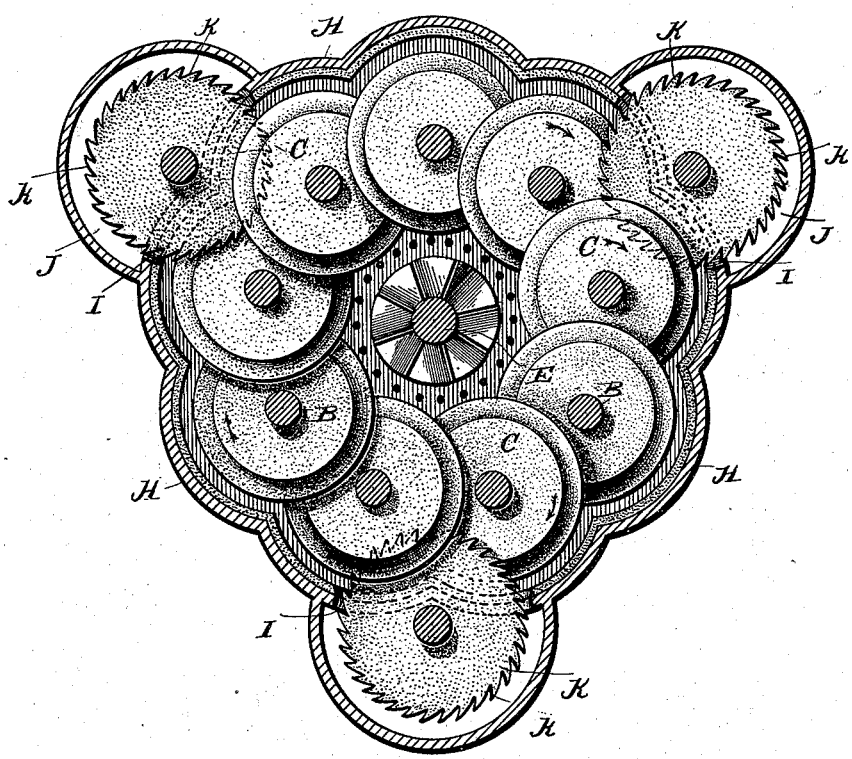

(No Model.) 2 Sheets—Sheet 1.

J. J. FAULKNER.
COTTON SEED DELINTER.

No. 559,056. Patented Apr. 28, 1896.

Witnesses
Victor J. Evans.
Marie Wilson.

Inventor
James J. Faulkner.
By E. W. Marble & Son
Attorneys (No Model.) 2 Sheets—Sheet 2.

J. J. FAULKNER.
COTTON SEED DELINTER.

No. 559,056. Patented Apr. 28, 1896.

Witnesses
Victor J. Evans.
Marie Wilson

Inventor
James J. Faulkner.
By E. M. Marble & Sons
Attorneys

UNITED STATES PATENT OFFICE.

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 559,056, dated April 28, 1896.

Application filed July 19, 1895. Serial No. 556,491. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in that class of cotton-seed delinters in which the lint is scoured off the surface of the seed under treatment by the abrading action taking place between overlapping series of abrading-disks, and particularly to improvements in that class thereof in which the abrading-disks are arranged vertically and the passage of the seed is downward through the machine; and it consists of the improved cotton-seed delinter whose construction and arrangement of parts will be hereinafter fully described, and particularly pointed out in the claims.

In the class of cotton-seed delinters in which the removal of the lint from the surface of the seed under treatment is effected by the abrading action taking place between overlapping series of vertically-arranged abrading-disks the chief difficulties which have been met with in practice have been the limited capacity of the machines, owing to the slow passage of the seed through the same and the limited amount of seed exposed at any one time to the abrading action, and the inability to remove the lint separated from the seed under treatment rapidly and efficiently.

The object of my invention is to provide a cotton-seed delinter of the general type thus stated in which the abrading-surfaces will be so arranged that a satisfactory quantity of seed may be continually fed to the same and delinted by the action thereof and in which the means provided for removing the lint from the abrading-surfaces will be sufficient to keep the same perfectly clean and free from lint, so that their action will be unimpaired.

In accomplishing the object of my invention I arrange the series of abrading-disks in a circular line, so that an inclosure is formed within the same, providing a circumferential casing to prevent the seed from being forced out of the range of action of the abrading-surfaces and feeding the seed to the machine through the central inclosure formed by the abrading-disks. The lint is scoured from the surface of the seed under treatment by being repeatedly thrown into contact with the abrading-surfaces through the action of the conveying device which I place in the inclosure formed by the same, the momentary contacts with the abrading-surfaces thus caused being sufficient to remove from the face of the seed acted upon all the lint which adheres thereto. The height of the machine, and therefore the number of abrading-disks arranged in a single vertical series, is sufficient to cause the seed under treatment to be subjected to a sufficient number of abrading-contacts to enable the entire surface of the seed to be scoured and freed from lint, so that a satisfactory product is obtained.

In the casing for the abrading-surfaces I form a plurality of longitudinal openings, in connection with which I place the open mouths of exhaust-air flumes. I further journal in said air-flumes series of abrading-disks, which work through openings in the delinting-cylinder casing, and, in connection with the air-flume, remove the lint from the abrading-surfaces. Means are provided for preventing any of the seed under treatment from escaping into the air-flume, so that no loss of stock takes place. The peripheries of the lint-removing disks are corrugated, so as to enable a more thorough removal of the lint to be effected.

My invention is fully represented in the drawings which accompany and form a part of this application, in which the same reference-letters refer to the same or corresponding parts, and in which—

Figure 2:
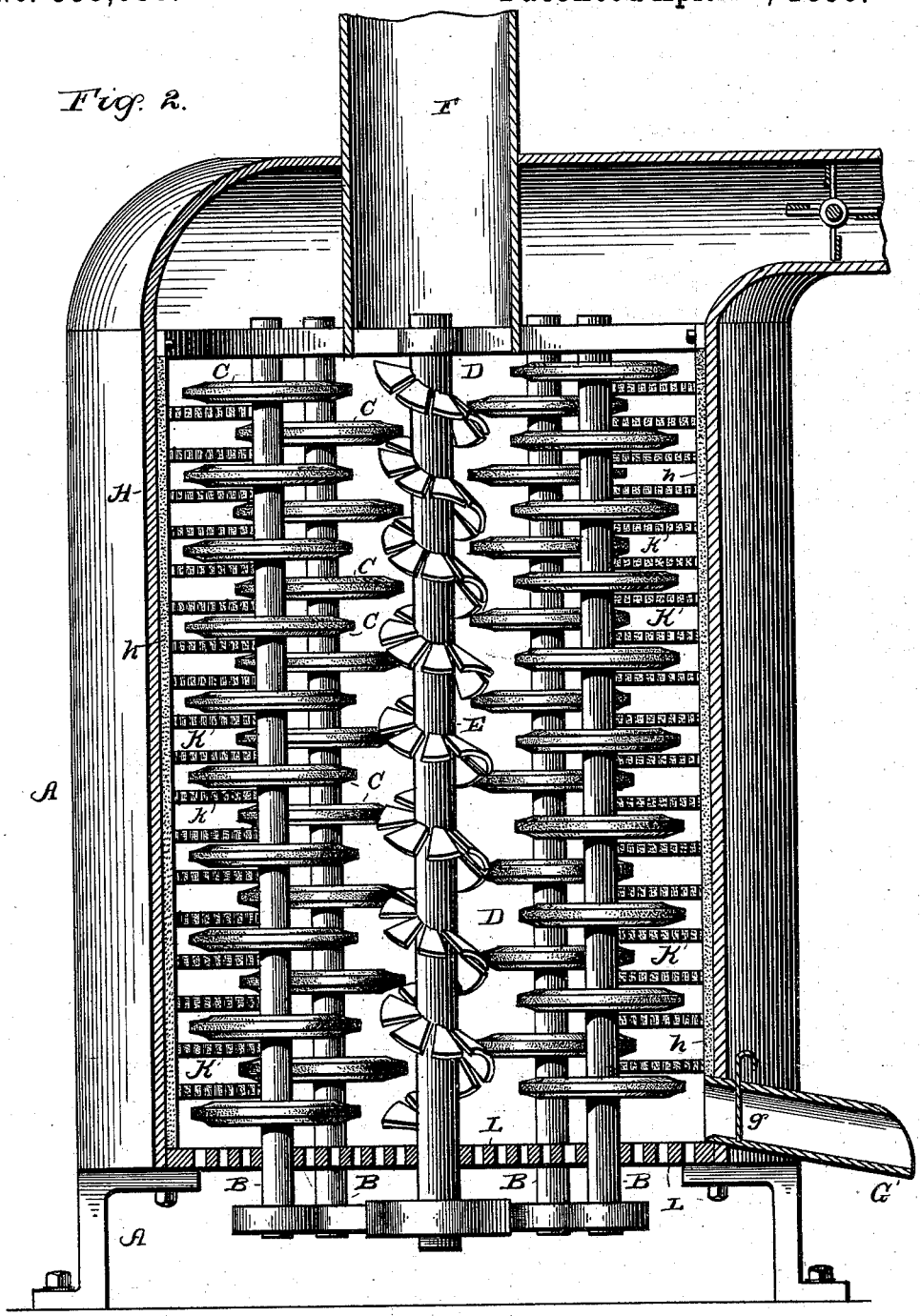

Figure 1 is a central horizontal section of my machine, showing the arrangement of the abrading-disks and the inclosure formed thereby. Fig. 2 is a vertical section of my machine, showing the relation which the lint-removing disks bear to the abrading-surfaces and also illustrating the vertical arrangement of the abrading-disks.

Referring to the drawings, A represents the machine-frame. This frame is vertically arranged and is formed with suitable bearings for the shafts B, upon which are mounted the abrading-disks C. These disks are so arranged that their peripheries overlap each other, the effective lint-removing portion of the disks being that which intermeshes with the series of disks on the sides of the same. The arrangement of the series of abrading-disks is, further, circular, and is such as to cause an inclosure D to be formed within the same. In this inclosure I place the feeding-spiral E, which acts to convey the seed from the feed-opening F to the discharge-opening G and to continually force the seed into contact with the abrading-surfaces, so that a thorough scouring of the surface of the same is insured and the removal of all of the lint therefrom effected. The momentary contact which the seed thus has with the abrading-surfaces is sufficient to remove all of the lint from the face of the seed presented to the action thereof. The number of abrading-contacts to which the seed is subjected during its passage through the machine is sufficient to thoroughly scour the same and remove from the surface thereof all of the lint adhering thereto, so that the product, as it is discharged through the discharge-opening G in quantities regulated by the position of the valve g, is in a satisfactory condition.

To prevent the seed from falling out of the range of action of the abrading-surfaces I provide a circumferential casing H, which is provided with an emery lining h, so that the seed which reaches the surface of the casing is here subjected to an abrading action.

I further form a plurality (in this case three) of longitudinal openings I in the casing and place in connection with said openings air-flumes J, through which an exhaust-current of air is caused to pass in a suitable manner, so that the lint which is scoured off the seed by the action of the machine is drawn upward into the air-flume and discharged on the surface of the condenser-cylinder or elsewhere, as desired. To aid the air-current in removing the lint from the abrading-surfaces and to render the removal of such lint certain, I journal in said air-flumes series of disks K, which in a measure intermesh with the abrading-disks. These lint-removing disks are formed with roughened peripheries k, so that they will scour from the surface of the abrading-disks all the lint which has been removed from the seed and will carry the same out into the air-flume J, whence it will be drawn upward by the action of the outward air-current existing therein. The dirt which is always present with the seed as it is fed into cotton-seed delinters falls out of the machine through the perforated bottom L of the delinting-cylinder casing.

The operation of my machine is as follows: Seed is fed into the machine through the feed-spout F and is conveyed through the same and forced into contact with the abrading-disks B by the spiral conveyer E, which is stationed in the inclosure formed by the arrangement of the abrading-disks. The seed, before it is discharged through the discharge-spout G in quantities regulated by the position of the valve g, is subjected to such a number of contacts with the abrading-disks that its surface is entirely cleaned and freed from lint, so that it forms a satisfactory product. The lint, as rapidly as it is removed from the seed by the abrading-surfaces, is carried away from the same by the joint action of the exhaust-air current existing in the air-flumes J and of the lint-removing disks K, which are provided with roughened peripheries k, in order to thoroughly scour and clean the surfaces of the abrading-disks. The dirt which is present with the seed as it is fed into the machine escapes through the perforate bottom L of the delinting-cylinder casing.

I do not herein claim the use of a moving lint-removing device formed so as to permit free passage of air therethrough and stationed in an air-flume in free communication with the abrading-surfaces, as this is claimed in a separate application filed by me May 20, 1895, Serial No. 549,980.

Having thus fully described my invention, what I claim as new, and desire to secure by Letters Patent, is—

1. In a cotton-seed delinter, the combination with a plurality of vertical shafts arranged in endless series, series of overlapping abrading-disks mounted thereon, and means for preventing the seed under treatment from falling out of the range of action of said disks, of a seed-inlet opening, a conveying device operating within the inclosure formed by the disks, a seed-discharge opening, and means for removing the lint separated by the action of the machine, substantially as described.

2. In a cotton-seed delinter, the combination with a plurality of vertical shafts arranged in endless series, series of overlapping abrading-disks mounted thereon, and means for preventing the seed under treatment from falling out of the range of action of said disks, of a seed-inlet opening, a spiral conveyer operating within the inclosure formed by said disks, a seed-discharge opening, and means for removing the lint separated by the action of the machine, substantially as described.

3. In a cotton-seed delinter, the combination with a plurality of vertical shafts arranged in endless series, series of overlapping abrading-disks mounted thereon, and a circumferential casing therefor, of a seed-inlet opening, a conveying device operating within the inclosure formed by said disks, a seed-discharge opening, and means for removing the lint separated by the action of the machine, substantially as described.

4. In a cotton-seed delinter, the combination with a plurality of vertical shafts arranged in endless series, series of overlapping abrading-disks mounted thereon, and means for preventing the seed under treatment from falling out of the range of action of said disks, of a seed-inlet opening, a conveying device operating within the inclosure formed by said disks, a seed-discharge opening, and means for causing an outward air-current to remove the lint separated by the action of the machine, substantially as described.

5. In a cotton-seed delinter, the combination with a plurality of vertical shafts arranged in endless series, series of overlapping abrading-disks mounted thereon, and a circumferential casing therefor having an aperture thereon, of a seed-inlet opening, a conveying device operating within the inclosure formed by said disks, a seed-discharge opening, an air-flume in communication with the abrading-surfaces through said aperture in the casing, means for preventing the discharge of seed into the same, and means for causing an outward current of air therein, substantially as described.

In testimony whereof I affix my signature in presence of two witnesses.

JAMES J. FAULKNER.

Witnesses:
C. L. BERLIN,
J. T. BLAIR.